Figure 1:
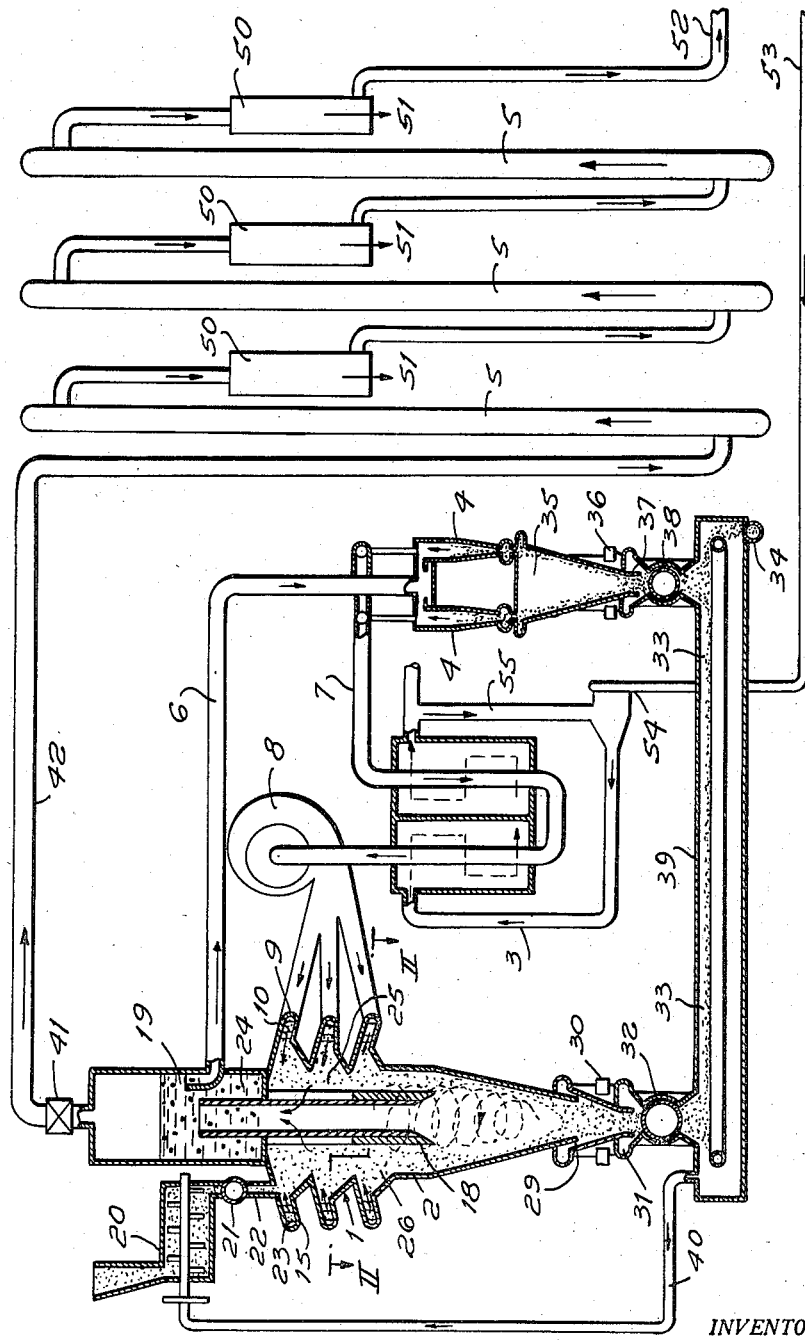

April 7, 1959

C. GLINKA 2,881,126

METHOD FOR EXTRACTION OF OIL FROM OIL-CONTAINING MINERALS

Filed May 5, 1954

3 Sheets-Sheet 1

INVENTOR.
CARL GLINKA
BY

April 7, 1959 C. GLINKA 2,881,126
METHOD FOR EXTRACTION OF OIL FROM OIL-CONTAINING MINERALS
Filed May 5, 1954 3 Sheets-Sheet 3
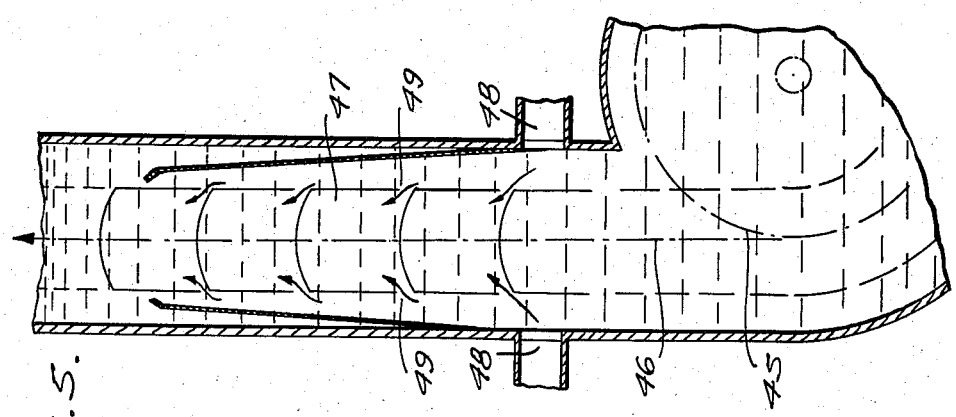
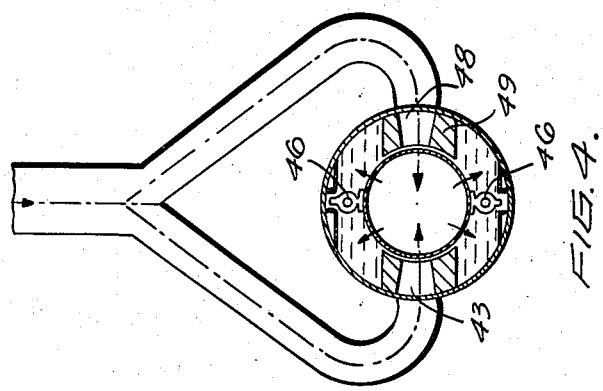
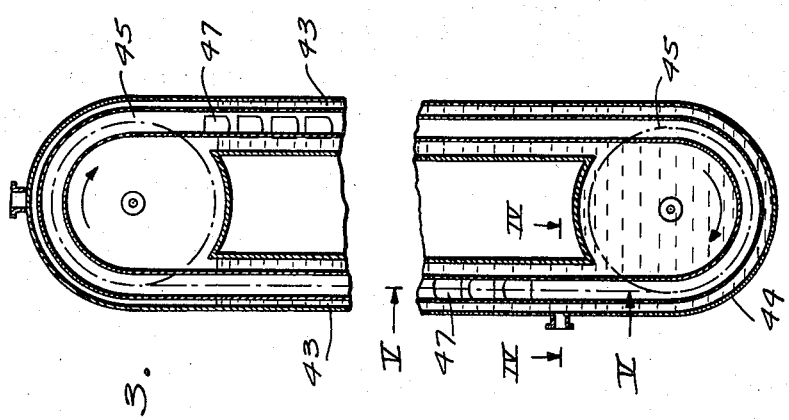
INVENTOR.
CARL GLINKA
BY

2,881,126

METHOD FOR EXTRACTION OF OIL FROM OIL-CONTAINING MINERALS

Carl Glinka, Krefeld-Uerdingen, Germany

Application May 5, 1954, Serial No. 427,799

Claims priority, application Germany May 6, 1953

5 Claims. (Cl. 208—11)

The object of the invention is a method and apparatus for extraction of oil from oil-containing minerals such as bituminous fuels, oil shale or the like.

It should be understood, that throughout the following specification and claims the term "oil-containing minerals" comprises minerals, which either contain oil in proper form or contain materials e. g. waxes, which materials by the treatment applied according to the invention are converted totally or partially into oils.

The invention especially relates to methods in which the said extraction is effected by heating the oil-containing minerals up to about 400–450° C., at which temperature the bitumens or oils already contained in proper form are converted into oil vapors and the bituminous raw materials possibly contained in said oil-containing minerals are converted into bitumens from which the oil is extracted in the form of oil vapors.

In the prior art this was generally effected by heating the oil-containing minerals with the aid of heated contact surfaces or heat carrying gyrating gases. In the course of the heating process, the moisture contained in the substances is first evaporated, then, as the temperature rises to about 450° C., the light, medium and heavy oil vapors are formed successively and are liquefied by cooling in another stage of the process.

These processes which are executed in apparatus of various kinds necessitate relatively long periods of treatment and consequently very voluminous plant resulting in high costs for construction and maintenance. According to increasing voluminosity of the said plant the working energy required grows as well as the amount of heat necessary for replacement of losses by radiation which increase according to rising voluminosity of said plant.

The oil content of the minerals to be treated varies between 6 and 15%. The variation may occur in different minerals but also in the same group of minerals. In every case very large quantities must be conveyed, prepared and subjected to the treatment process itself, if the oil is to be obtained on an industrial scale. The limits of economic recovery of the oil are generally narrow and are quickly reached if the oil content of the minerals to be treated is low and they carry moisture which has to be evaporated. The water content of oil shale may be as high as 40% and in the case of crude brown coal or lignite as high as 60%, based on the wet weight. Such cases necessitate special arrangements in order to insure that the relation between the amount of fuel recovered and the mechanical and electrical energy required to carry out the separation process should not be uneconomic.

According to the invention the minerals to be treated, are heated in an oil bath of at least 400° C. under such pressure that the oil fractions of the highest boiling temperatures capable of being extracted from said minerals do not evaporate. For the oil bath any suitable oil having an appropriate high boiling point can be used. Preferably the highest boiling fraction or a mixture of the highest boiling fractions of the heavy oil which is capable of being extracted from the said minerals are elected. The said boiling point amounts to about 350° C. or higher. The working pressure for the oil will be preferably so determined, that the boiling point of the oil rises to about 500° C.

The oil-containing minerals introduced into the oil bath are very rapidly heated up to 100° C. under simultaneous evaporation of the water and further up to 400–450° C. by the action of the hot oil. In the course of this heating occurs the transformation of the bituminous raw materials contained in said oil-containing minerals into bitumen and the conversion of the oil from the liquid into the gaseous phase. The light and medium oil vapors, whose temperatures are lower than the boiling point of the heavy oil are separated, while the heavy oil gained having the same boiling point as the oil of the bath remains in said bath. The heating process being finished, the solid remainder still under pressure is separated from the oil of the oil bath e.g. by means of a hydro-cyclone and is conducted into another closed space of much lower pressure such as about atmospheric pressure via a sluice. During this transfer the oil of the bath still adhering to the surface of the solid remainder, or the heavy oil having been formed and still bound in said remainder are instantly evaporated by the heat contained in and carried with said oil and remainder, the temperature of which, according to the working pressure used is higher than the normal boiling point of said heavy oils. All the process takes place in a very short period of time especially if the mineral to be treated is introduced into the oil bath in a fine granular state, so that the heat from the bath can penetrate into the minerals to be treated through a large surface. The large masses to be treated thus pass an apparatus of small dimensions in quick motion.

The treatment of the minerals in heated oil also presents the advantage that the steam and oil vapors generated in the oil, and also the gas from low-temperature distillation are entirely free from dust. In this state the gases and vapors generated under pressure can be expanded in a power engine, converting the heat energy of the gases and vapors into mechanical energy, the latter being very important in cases of high water contents of the minerals to be treated. If e.g. 1000 tons of raw material with a moisture content of about 40% based on the wet weight are fed into the plant per hour apart from the gases and oil vapors about 400 tons of steam are developed which can be utilized for power generation.

The moist crude material, as aforesaid, should be introduced into the process in granular state. If this disintegration is carried out with the very simple means aimed at and also without additional pre- or intermediate treatment of the material, a disintegration of the material in a grain mixture of about 0 to 4 mm. grain diameter is attained in the case of wet brown coal, lignite or oil shale. As the period of treatment for the fine grained material is considerably shorter than that required for the treatment of coarse grained material, it is advisable to conduct the fine material through the oil stream quicker or by a shorter route. This differential time of treatment is attained if the oil is introduced into a cylindrical chamber and distributed over the periphery in such a direction that component forces form on the point of contact between the tangentially onflowing oil and the oil located in the treatment chamber, one of which forces is tangentially directed and imparts a rotary or gyratory motion to the oil, and the other is radially directed and counteracts the centrifugal force of the rotating oil masses, so that the onflowing oil supports the rotating oil ring at a slight distance from the wall of the cylindrical chamber. If the granular material to be treated is introduced into the rotating oil ring the coarser particles, corresponding to their greater mass, pass into the outer circle of movement of the oil under the action of centrifugal force. They cannot pass the boundary circle thereof to a great extent because once outside they encounter the region of the onflowing oil. Here the frictional resistance in the oil masses exceeds the centrifugal force of the coarser grains, so that these follow the direction of movement of the oil and are returned into the outer movement circle of the rotating oil masses.

The oil continually flowing on in tangential direction moves from the outer movement circle in inward direction. The finer particles follow this spiral movement because their centrifugal force is less than the sweeping force which is produced by the frictional resistance between the fine grained material and the oil masses. The coarse grains, having a greater mass, are maintained in the outer circle of motion of the oil ring under the action of centrifugal force until their mass has been reduced by the evaporation of water to such an extent that they also follow the movement of the oil in inward direction, or, after circulating repeatedly, sink below the admission point of the oil into the collecting chamber for the solid material under the action of gravity.

According to the size of the grains the material distributes itself in different parts of the treatment chamber between the boundary of movement of the coarse grains and that of the fine grains. The finest particles of material pass through the chamber along the shortest route, whereas the coarser particles follow a longer route corresponding to a longer time of treatment.

During the expansion or cooling of the gases and vapors developed in the process, a portion of the oil vapors condenses. An ordinary power engine can therefore not be used for the expansion of the mixture; special engines are necessary the construction and mode of operation of which is determined by the peculiarity and characteristics of the driving agent. The expansion preferably takes place in columns of oil, several of which are arranged side by side and through which the gas-vapour mixture flows successively. The gas-vapour mixture which is introduced into the lower part of the first column of oil at a pressure of about 10–15 atmospheres and a temperature of about 450° C., flows therethrough with a reduction in pressure according to the height of the head of liquid. On its way through the column of oil the mixture expands in accordance with the drop in pressure. At the same time, due to the expansion work taking place, the temperature of the mixture drops. This is repeated in the successive columns of oil until the gases and vapors are completely expanded. Following each oil column a portion of the oil vapors, corresponding to the drop in temperature, can be condensed by impingement, that is the oil is obtained fractionated. The volume of the gas-vapor mixture becomes operative as a buoyant force in the oil columns if the mixture is introduced into the expansion vessels which rotate in the oil columns linked up in chain fashion. In ascending, the volume of the gas increases in the vessels in accordance with the reduction of pressure in the upper end of the oil column and at the same time the buoyancy force also increases and becomes greatest towards the end of the expansion.

The gas vapor mixture is preferably expanded to about 3 atmospheres and the off-flowing gases and vapors, after the separation of the heavy and medium weight oils, are introduced into a washer which operates under a pressure of 3 atmospheres. Under this pressure the light oils are more rapidly absorbed by the wash oil than in a washer operating below atmospheric pressure. Furthermore, the remaining steam and the gas can be utilized in an ordinary turbine connected up with a condensation system.

Figure 2:
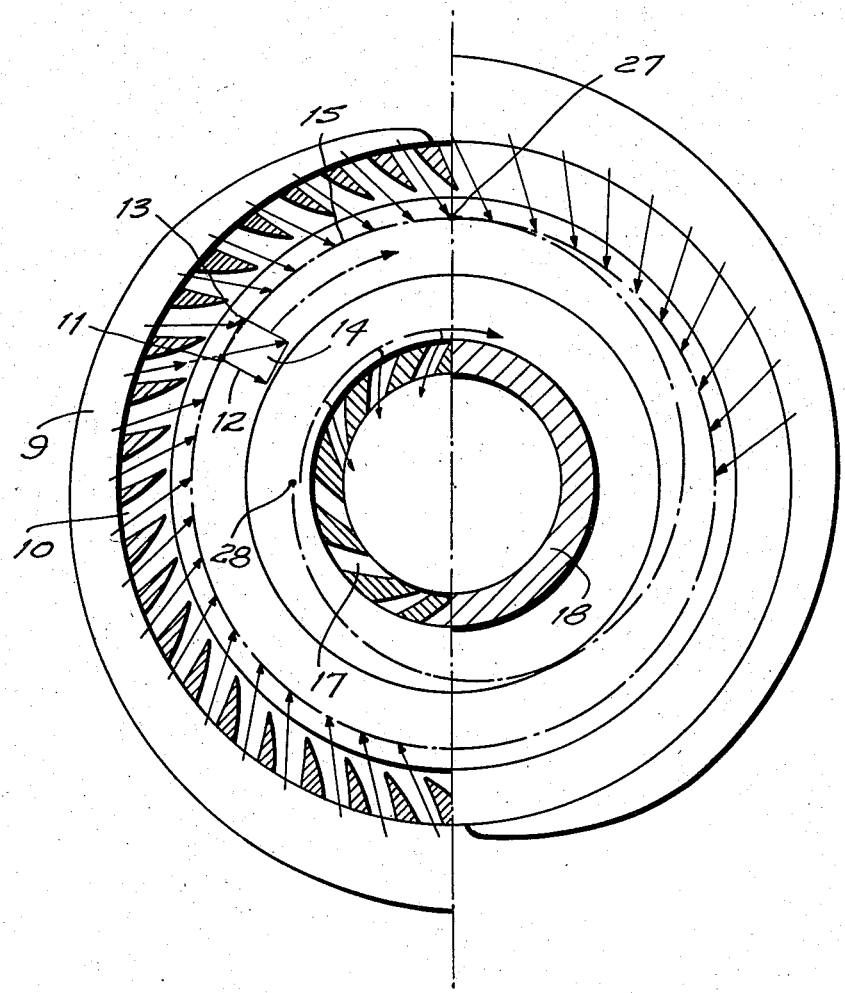

The invention is hereinafter described with reference to the accompanying drawings, in which:

Fig. 1 is a diagrammatic view showing a plant for the treatment of crude brown coal with a granulation of 0 to 5 mm. grain diameter in a heated oil stream, Fig. 2 is a section in the horizontal plane through the distillation chamber, taken on line II—II of Fig. 1, Fig. 3 shows an expansion column with circulating expansion vessels, Fig. 4 is a horizontal section through the gas admission point in the expansion column, taken on line IV—IV of Fig. 3 and Fig. 5 is a vertical section through the gas admission point, taken on line V—V of Fig. 3.

The distillation plant illustrated in Fig. 1 consists substantially of a still 1 connected up with a separating chamber 2, in which the liquid oil is separated from the solid material, a heater 3, fine separator 4 and expansion column 5. The still 1 with the separating chamber 2 and fine separator 4 and the connecting conduits 6 and 7 are filled with heavy oil which is circulated through the plant by means of a pump 8. This pump 8 feeds the oil into the annular chamber 9 and thence through the nozzle rings 10 into the still 1. At the point of contact 11, Fig. 2, between the inflowing oil and the oil in the still, component forces 12 and 13 form from the force 14, their strength being determined by the mass and acceleration of the inflowing oil. A gyratory motion is imparted to the oil in the still 1 by the tangentially directed force 13. The radially directed force 12 corresponds in strength to the centrifugal force acting in the opposite direction in the gyrating oil masses. When the inflowing oil masses attain a certain speed, this system of forces is set up at a short distance from the inflow point by which the outer circle of motion 15 of the oil rotating in the distillation chamber is also determined. The gyrating oil moves along an upwardly extending spiral path towards a hollow cylindrical member or stand pipe 18, the wall of which is provided with slit-like apertures 17 through which the oil flows from the heating and water-evaporating zone into the interior of the cylindrical body and thence in upward direction into the collecting chamber 19. The oil from the distillation zone descends in a spiral movement in vertical direction and then rises according to the movement in a cyclone through the standpipe 18, Fig. 1, into the collecting chamber 19. The oil enters the fine separator 4 through the conduit 6. The fine separator is composed of several small hydrocyclones in which the fine material swept along is separated out. The oil separated from the fine material flows through the conduit 7 into the heater 3, is there heated to such a high temperature that the absorbed heat is sufficient for the heat required in the process.

The material to be treated is introduced with a grain size of 0 to 5 mm. grain size into the preparing chamber 20 and, by introducing some of the heavy oil circulating in the process, is brought into a state suitable for pumping. The pump 21 feeds the material at 22 into the heated oil circulating in the still. The coarse grains, under the influence of centrifugal force, will move in the outer movement circle 15, Fig. 2, of the rotating oil masses. The falling motion of the grains is impeded by the gentle upwardly directed inflowing oil 23 so that these grains do not reach the second zone 25 in which the water is evaporated, until they have circulated a number of times through the first heating zone 24. They also circulate repeatedly through the zone 25 before passing into the third zone 26 in which the distillation takes place. The finer grains, owing to the frictional resistance in the oil masses, immediately follow the path of the oil and move along in downward direction along the spiral path indicated by the line 27, 28, Fig. 2.

The separation of the solid residues after distillation, takes place below the distillation zone 26 in the separator chamber 2. Here the oil masses press against the wall of the separator chamber sweeping along the sinking residues which collect in the point 29 of the separator chamber.

During the heating process, water and oil vapor and also the gaseous product from distillation are formed. The plant is operated in such a manner that a pressure of about 10-15 atmospheres is attained and maintained by regulating the quantity of off-flowing vapor, in the still and in the apparatus connected therewith. The material separated from the heavy oil is compressed in the point 29 of the separator chamber by a vibrator 30 and conducted over the grid 31 and lock 32 into the discharge chamber 33 in which the pressure is atmospheric. As the material passes out of the chamber under high pressure into the chamber of atmospheric pressure, the heavy oil still adhering to the surface of the residues and also the heavy oil which is still bound is evaporated in a very short time by the heat carried along by the material and liquid. The remaining distillation coke is discharged at 34. The fine material separated in the hydrocyclone 4 is conducted into the collecting chamber 35 as above described, is there compressed by the vibrator 36 and fed through the grid 37 into the sluice or lock 38. From this point the material is conducted into the discharge chamber 33 of atmospheric pressure, where the adhering and bound heavy oil is evaporated. The heavy oil vapors forming in the discharge chamber of atmospheric pressure and conducted through the conduit 40 into the treatment chamber 20, give up their heat to the cool inflowing minerals and condense therein.

The steam and oil vapors forming in the distillation chamber collect above the oil level in the chamber 19; likewise the vapors which form in the standpipe 18. Thence the vapors, which are collected at the working pressure of about 10-15 atmospheres, are conducted at a temperature of about 450° C. through the pressure regulator 41 and conduit 42 into the expansion column 5 filled with oil. This consists of two tubes 43, Fig. 3, which are connected top and bottom by U-shaped bends 44. Reversing wheels 45 are mounted in these connecting bends and guide two parallel circulating chains or wire ropes 46. The cylindrical expansion vessels 47, closed at one end, are mounted on these ropes. Fig. 4 shows a horizontal section through the admission point for the gas vapor mixture in the expansion vessels and Fig. 5 shows a vertical section through said admission point. The mixture is introduced at 48 at a pressure slightly above the pressure in the oil column, into the distribution pockets 49 which surround the circulating expansion vessels. The distribution pockets are so shaped that the inflowing gases penetrate into the vessels through the slits provided in the walls of the individual vessels. The mixture under constant pressure displaces a quantity of oil corresponding to the inflowing volume of the mixture, from the vessels which are so dimensioned that the quantity of gases accommodated does not flow off over the lower open edge of the vessels during the expansion which follows.

The buoyance power transmitted by the expansion-vessels onto the ropes or chains is further transmitted by the reversing wheels 45 onto shafts, which drive a generator not shown.

The vapors flow through the first expansion column undergoing a drop in pressure corresponding to the height of the column, and, on the way from the first to the second expansion column, are conducted over an oil separator 50 in which these oil vapors are condensed by impingement which have a condensation temperature which has been exceeded by the expansion. The condensed oil is drawn off at 51. The vapors flow through the succeeding expansion columns in a similar manner so that the oil, according to the different expansion temperatures in these columns, is condensed already prefractionized. The light oils remaining in the gas-steam mixture are conducted in known manner into an oil washer at 52 and there separated from the gas-steam mixture. The separation of the gases and steam is effected by condensation of the steam. The remaining gaseous products from distillation are fed through the conduit 53 to the burner 54 and utilized for heating up the gyrating oil current. The heating gas flows through the heater 3 in counterflow, a portion of the waste gases being passed through the conduit 55 and utilized for bringing the combustion gases to the permissible metal temperature of the heater.

The invention covers different possible forms of construction of the apparatus employed and ways of carrying out the process. Thus, if the material is very moist and contains little oil, the steam generated in the first and second zones can be separated from the oil vapors formed in the third zone. The steam leaves the oil bath in superheated state and free from dust, so that it can be used in an ordinary steam engine for producing energy. The separated oil vapors are then condensed in known manner.

I claim:

1. Method of separating oils from oil-containing minerals having a water content of 40% comprising the steps of passing through a fluid bath being maintained at a predetermined pressure and predetermined temperature, solid minerals containing lower boiling point oils vaporizable in said bath at said predetermined pressure and predetermined temperature and higher boiling point oils non-vaporizable in said bath at said predetermined pressure and temperature whereby said lower boiling point oils and the water contained in said minerals are vaporized in said bath; removing the thus vaporized lower boiling point oils and water; transferring from said bath the thus treated solid minerals containing only higher boiling point oils and being substantially at said predetermined temperature of said fluid bath into a separation zone where a lower pressure than said predetermined pressure prevails, causing thereby evaporation of said higher boiling point oils; removing the thus vaporized higher boiling point oils, thus obtaining said lower boiling point oils and said higher boiling point oils separated from each other and said solid minerals; and directly converting the vaporized oils and water into mechanical energy.

2. Method of separating oils from oil-containing minerals having a water content of 40% comprising the steps of passing through an oil bath being maintained at a predetermined pressure and predetermined temperature, solid minerals containing lower boiling point oils vaporizable in said bath at said predetermined pressure and predetermined temperature and higher boiling point oils non-vaporizable in said bath at said predetermined pressure and temperature whereby said lower boiling point oils and the water contained in said minerals are vaporized in said bath; removing the thus vaporized lower boiling point oils and water; transferring from said bath the thus treated solid minerals containing only higher boiling point oils and being substantially at said predetermined temperature of said oil bath into a separation zone where a lower pressure than said predetermined pressure prevails, causing thereby evaporation of said higher boiling point oils; removing the thus vaporized higher boiling point oils, thus obtaining said lower boiling point oils and said higher boiling point oils separated from each other and said solid minerals; and directly converting the vaporized oils and water into mechanical energy.

3. Apparatus for separating oil from oil-containing minerals including oils having a boiling point above a predetermined temperature, comprising, in combination, a distillation apparatus having a first, a second and a third zone; means for maintaining each of said zones of said distillation apparatus at a pressure substantially higher than atmospheric pressure; means for introducing a fluid flow medium into said first zone of said distillation apparatus, said fluid flow medium having a boiling point at atmospheric pressure at least equal to said predetermined temperature; means for heating said fluid flow medium before it is introduced into said distillation apparatus; means for introducing the oil-containing minerals into said first zone of said distillation apparatus where said minerals are carried by said fluid flow medium into said second zone of said distillation apparatus, said minerals being heated in said second zone; means for returning said heated minerals back to said first zone where they are heated by said fluid flow medium to a temperature above the boiling point of water; means for introducing said minerals from said first zone into said third zone where they are heated to a temperature substantially higher than said predetermined temperature; and means for transmitting said thus heated minerals from said distillation apparatus into an area of atmospheric pressure where the oil having a boiling point above a predetermined temperature is vaporized.

4. Apparatus for separating oil from oil-containing minerals including oils having a boiling point above a predetermined temperature, comprising, in combination, a distillation apparatus having a first, a second and a third zone; means for maintaining each of said zones of said distillation apparatus at a pressure substantially higher than atmospheric pressure; means for introducing an oil into said first zone of said distillation apparatus, said oil having a boiling point at atmospheric pressure at least equal to said predetermined temperature; means for heating said oil before it is introduced into said distillation apparatus; means for introducing the oil-containing minerals into said first zone of said distillation apparatus where said minerals are carried by said oil into said second zone of said distillation apparatus, said minerals being heated in said second zone; means for returning said heated minerals back to said first zone where they are heated by said oil to a temperature above the boiling point of water; means for introducing said minerals from said first zone into said third zone where they are heated to a temperature substantially higher than said predetermined temperature; and means for transmitting said thus heated minerals from said distillation apparatus into an area of atmospheric pressure where the oil having a boiling point above a predetermined temperature is vaporized.

5. Apparatus for separating oil from oil-containing minerals including oils having a boiling point above a predetermined temperature, comprising, in combination, a distillation apparatus having a first, a second and a third zone; means for maintaining each of said zones of said distillation apparatus at a pressure substantially higher than atmospheric pressure; means for introducing a fluid flow medium into said first zone of said distillation apparatus, said fluid flow medium having a boiling point at atmospheric pressure at least equal to said predetermined temperature; means for heating said fluid flow medium before it is introduced into said distillation apparatus; means for introducing the oil-containing minerals into said first zone of said distillation apparatus where said minerals are carried by said fluid flow medium into said second zone of said distillation apparatus, said minerals being heated in said second zone; means for returning said heated minerals back to said first zone where they are heated by said fluid flow medium to a temperature above the boiling point of water; means for introducing said minerals from said first zone into said third zone where they are heated to a temperature substantially higher than said predetermined temperature; means for transmitting said thus heated minerals from said distillation apparatus into an area of atmospheric pressure where the oil having a boiling point above a predetermined temperature is vaporized; and means for converting the vaporized oil into mechanical energy.

References Cited in the file of this patent

UNITED STATES PATENTS

| | | |
|---|---|---|
| 29,149 | Durham | July 17, 1860 |
| 1,778,515 | Hampton | Oct. 14, 1930 |
| 2,312,706 | Freeman | Mar. 2, 1943 |
| 2,423,527 | Steinschlaeger | July 8, 1947 |
| 2,449,096 | Wheeler | Sept. 14, 1948 |
| 2,510,781 | Howard | June 6, 1950 |
| 2,530,181 | Schilling | Nov. 14, 1950 |
| 2,601,257 | Buchan | June 24, 1952 |
| 2,620,925 | Tedman | Dec. 9, 1952 |